United States Patent [19]

Smith

[11] Patent Number: 5,234,708

[45] Date of Patent: Aug. 10, 1993

[54] EXTRACTION OF CHERRY FLAVORING FROM JUICE

[76] Inventor: Mary A. Smith, P.O. Box 198, Omena, Mich. 49674

[21] Appl. No.: 813,811

[22] Filed: Dec. 26, 1991

Related U.S. Application Data

[63] Continuation-in-part of Ser. No. 669,107, Mar. 13, 1991, abandoned.

[51] Int. Cl.$^5$ ............................................. A23L 2/02
[52] U.S. Cl. .................................. 426/599; 426/384; 426/489; 426/524; 426/655
[58] Field of Search ............... 426/384, 599, 655, 524, 426/489, 385

[56] References Cited

U.S. PATENT DOCUMENTS

| | | | |
|---|---|---|---|
| 76,266 | 3/1868 | Storey | 426/384 |
| 1,036,338 | 8/1912 | Ressencourt et al. | 426/40 |
| 1,211,361 | 1/1917 | Sheehan | 426/384 |
| 2,182,829 | 12/1939 | Thomas | 426/615 |
| 2,395,498 | 2/1946 | Neyes | 426/384 |
| 2,416,945 | 3/1947 | Noyes | 426/384 |
| 2,424,663 | 7/1947 | Mantle | 426/384 |
| 2,588,337 | 3/1952 | Sperti | 426/384 |
| 2,602,750 | 7/1952 | Cunningham | 426/384 |
| 4,752,495 | 6/1988 | Smith | 426/615 |

FOREIGN PATENT DOCUMENTS

3740958 6/1989 Fed. Rep. of Germany ...... 426/524
3233772 9/1988 Japan .................................... 426/524

OTHER PUBLICATIONS

"Researcher looks at New Cherry Juice Products", The Great Lakes Fruit Growers News—Mar. 1988.
"Findings From New York Juice Experiment Look Promising" The Great Lakes Fruit Growers News—Mar. 1988.
"Cherry Tree Survey Scheduled: Oct. 2–Nov. 15" Quarterly Review—Cherry Marketing Inst, Oct. 1990, vol. 3.

Primary Examiner—Carolyn Paden
Attorney, Agent, or Firm—Wood, Herron & Evans

[57] ABSTRACT

Flavoring is extracted by freezing cherry juice and slowly thawing it in above freezing ambient temperatures, in the range of about 32°–36° F., while continuously draining off a liquid fraction. Liquid which thaws at ambient temperatures as low as 28° F. can be included with the fraction which is thawed in the above freezing range, but a total of no more than the first 60% by weight of the frozen material to thaw should be used. The liquid fraction so separated comprises an excellent flavoring; the undesirable flavor and color degrading components are largely left in the last approximately 40% of the frozen material to thaw, which is discarded.

23 Claims, 1 Drawing Sheet

EXTRACTION OF CHERRY FLAVORING FROM JUICE

RELATED APPLICATION

This application is a continuation-in-part of my copending application Ser. No. 669,107, filed Mar. 13, 1991 which is now abandoned.

FIELD OF THE INVENTION

This invention relates to the extraction of cherry flavoring from cherries.

BACKGROUND OF THE INVENTION

The search for a good natural cherry flavoring has been long and difficult. The juice pressed from cherries in most cases has a bitter note. It has been particularly difficult to obtain a desirable flavoring from cherries of the Montmorency variety, which is one of the most commercially important of all types of sour cherries. Research carried out by the cherry industry has established that conventional Montmorency juice contains an enzyme (believed to be polyphenyloxidase), which contributes to poor flavor and color instability of its juice. That enzyme can be destroyed by heat, but the heating destroys the anthocyanin components (which give the good rich cherry color) and degrades the product to an unappetizing brown color. The industry has spent large sums searching for a new sour cherry cultivar with more flavor in the flesh, sweeter than the Montmorency cultivar, and without the offending enzymes that impair the commercial use of sour cherry flavoring. That search has not thus far been successful.

BRIEF DESCRIPTION OF THE INVENTION

I have found that a superior cherry flavoring can be extracted from cherries by a careful freezing/thawing extraction process. Cherry juice is subjected to temperatures of approximately 0°–10° F. until it forms a solid mass of ice crystals (a small amount of thick liquid syrup exudes from the crystals at the top of the solid mass). The solid mass is thereafter thawed at ambient tempeatures in the range of 32°–36° F., and the thawed liquid is continuously separated from the residual ice crystals, as by draining, so that contact of the thawed liquid with the remaining ice crystals is minimized. The liquid fraction which thaws and drains at ambient temperatures in the range of 32°–36° F. is the most desirable, but a minor portion of liquid which flows and drains at temperatures as low as 28° F. or lower (including the thick syrup which exudes at the top of the solid mass during freezing and remains unfrozen) can and preferably should also be included with the larger portion that is obtained at temperatures above the freezing point.

A differential flavor separation occurs during the freezing/thawing process. It is believed that during thawing in the 32°–36° F. range the liquid portion dissolves the desirable components from the ice, while the undesirable components remain in the solid phase. I have found that up to about the first 60% of the weight of the original crystal mass to thaw below about 36° F. is surprisingly free of the undesirable flavor components; those components are segregated by the freezing/thawing process and remain in the last approximately 40% of the block to thaw.

The separated liquid fraction has a deep blue-red color, a strong cherry flavor, a sweet taste, and does not have the unpleasant back note associated with current sour cherry juice. Subsequently thawed portions (or portions thawed above 36° F.) are progressively lighter in color and poorer in flavor. Moreover, I have found that the flavoring can be heated to pasteurize it (at about 180°–185° F.) without destroying its color or flavor, and can even be further concentrated by heating in a double boiler at 212° F.

DESCRIPTION OF THE DRAWINGS

The invention can best be further described by reference to the accompanying drawings in which.

DETAILED DESCRIPTION

Figure 1:
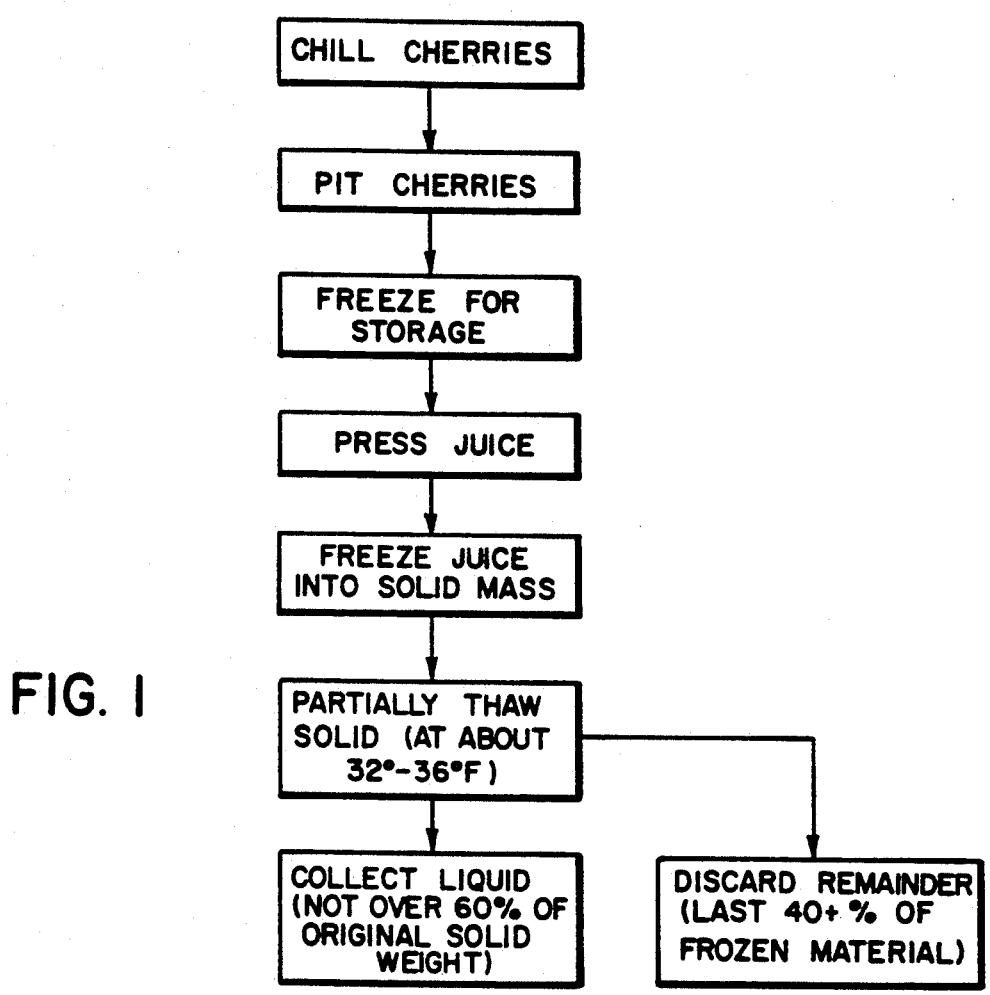
FIG. 1 is a flow chart which illustrates the preferred method of carrying out the process.

The cherries from which juice is to be extracted should of course be free of mold and well washed, and preferably should be kept chilled under running water until processed. The riper the cherries before harvesting, the sweeter the juice will be.

Cherries having a sugar content of 12 brix or higher are preferred. The invention is presently preferred for use with sour cherries, most preferably Montmorency cherries, although the process is believed to be applicable to other varieties of cherries as well.

The cherries should be pitted before further processing, and care taken to minimize pit breakage because crushed pits are believed to release benzaldehyde which harms the flavor. In order to avoid pit crushing the use of either a so-called "Elliot" brand pitter or a "Dunkley" brand pitter is preferred.

The pitted cherries should preferably be frozen (without sugar) and then thawed before juice is pressed from them; preferably they are frozen in barrels or plastic containers. It is believed that the steps of freezing and then thawing before the juice is pressed cause a desirable red pigment to be released from the cherry skin, which contributes to the good color of the final flavor product to be extracted. (The pigment can also be released by heating, but heating the juice itself harms both color and flavor.)

After the cherries are thawed, juice is pressed from them by using a cold pressing method; hot pressing is not desirable for purposes of this invention. Cold pressing is well known in the industry; for example a Suntech "Basket" press or a Goodnature Products "Squeezebox" press can be used. Pressing aids (for example, diatomaceous earth or rice hulls) may be used, and juice may be filtered after pressing if desired to improve its clarity.

The juice itself is then frozen, preferably into solid blocks having a minimum dimension of at least about 1". The juice can be frozen in a container (such as a plastic gallon jug) or in trays into blocks at least 1" thick, for example 4" high and indefinitely long. Freezing should be carried out at about 0°–10° F., and should be continued until a thick, deep red syrup is exuded at the top.

The process of freezing helps to differentiate (crystallize) different components into fractions, thereby separating color and desirable flavor components from other less desirable components.

Bulk separation of desirable from undesirable flavor components can be achieved by removing the block from low temperature storage and placing it in an ambient atmosphere in a critical temperature range and thawing it. Specifically, a substantial part (about 55-60% of the weight of the original block) of the frozen mass should be extracted in an ambient temperature (measured in the atmosphere around the block) of about 32°-36° F. The thick liquid syrup that is exuded from the ice can be separated by gravity, at lower ambient temperatures, down to 28° F. or even lower, and should be used with that thawed in the 32°-36° F. range. Nevertheless, substantial thawing should be carried out in the 32°-36° range. It is believed that as the solid mass is exposed to ambient temperatures up to 36° F., an apparently unfrozen component is released from the ice structure along with the portion that thaws at these temperatures. Up to about 60% of the original weight of the block can be collected. This 60% portion has color and flavor superior to the remaining portion, which melts at higher temperatures. The undesirable components of the original juice remain in the portion that is left, and is discarded.

As indicated above, the temperature at which the block is thawed is important. Thawing below about 28° F. yields only a small amount of thick unfrozen liquid. It is a highly colored extract but its flavor is weak, and draining is very slow and incomplete. Unless ambient temperature is raised above 28° most of the block does not melt at all, or only very slowly. Surprisingly, liquid which is melted above freezing, at ambient temperatures in the 32°-36° range, is very desirable. However, the small amount of thick syrup that drains below 32° F. should also be collected and used with the fraction thawed above the freezing point. On the other hand, thawing above about 36° melts the undesirable flavor components and does not produce a good flavor.

The thawed liquid is drained or otherwise continuously and rapidly separated from the block, preferably by draining from the frozen mass inverted from the position in which it was frozen. This keeps the liquid from co-mingling with the residual solid portion. The larger the block the more hours it takes at ambient temperatures of 32°-36° F. for the juice to drain from throughout it. The useful juice may drain in one hour from a one inch high block, while a frozen gallon jug may take three days to drain off 60%. The juice exudes not just from the outside surface of the solid mass, but also between crystals within the block. It seeps down internally as well as externally and leaves a network or "honeycomb" of interlocking plate-like crystals which remain frozen longer, up to about 40° F. The remaining crystals are interlocked, like a frost pattern, but are easily separable by a knife. The solid generally retains its external shape (see FIG. 2), at least until about 60% of it has melted, but it becomes relatively open and porous. (In contrast, pure water freezes and melts as a solid block, without honeycombing.) Most preferably the liquid is removed from all contact with the residual solid as rapidly as possible, by turning the frozen mass upside down from the position in which it was frozen and draining the liquid away without letting it collect or pool around the remaining solid portion.

Figure 2:
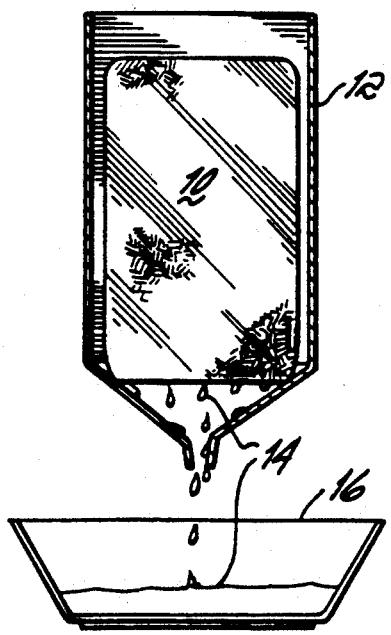
FIG. 2 is an diagrammatic cross-sectional view which illustrates one method of separating the liquid from a large frozen block.
Figure 3:
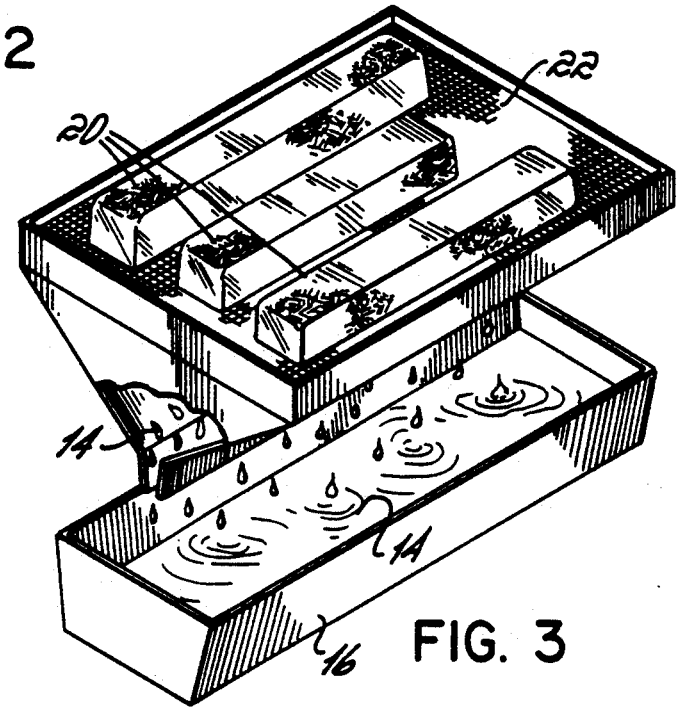
FIG. 3 is a perspective view showing how thawed liquid may be separated from elongated slabs, with minimal contact with the slabs after thawing.

As indicated above, the longer the liquid remains in contact with the partially melted block, the more it tends to melt the remaining fraction which contains the undesirable components and thereby become contaminated with them. For that reason it is preferable to melt the block 10, for example, frozen in a one gallon jug 12, so that the liquid 14 drains from its original top directly into a liquid collector 16 below it (FIG. 2). Multiple blocks turned upside down on a screen 20 (for example, 1"×4"×12") should be spaced apart on a screen 22 so that they do not drain onto one another and liquid from frozen ice is removed without draining back through ice (FIG. 3). The time required for thawing depends on block size, as well as temperature.

Surprisingly, up to about the first 60% of the weight of the block to thaw is remarkably free of the undesirable flavor components; they remain behind in the still frozen portion, provided the thawed portion is promptly drained off from the remaining solids. The last 40% to thaw contains the undesirable flavor notes and may be discarded.

At 34° ambient temperature, melting slows markedly after about 55% has thawed. The rest is less desirably flavored and melts only at higher temperature or long exposure time at 36° F.

Peculiarly, the frozen solid which remains after 50-60% of the block has melted has little color and is almost white as compared to the rich, darker color of the original frozen product.

The thawing may be carried out in a regular atmosphere; it is unnecessary to use nitrogen or other inert gas as a blanket. Even if the initial juice has a high proportion of suspended solids, the settling process that occurs during freezing tends to segregate the suspended solids and thus decreases the pectinase activity of the juice, and a relatively clear juice is obtained, but for optimum clarity filtering may be used.

The final product flavoring can be frozen to preserve it, or heated to pasteurize it, at temperatures up to about 185° F. without significantly degrading its color or flavor. It can be further concentrated by heating it to 212° F., as in a double boiler. No other process is known which can produce a flavor from Montmorency cherries that can be heated to so high a temperature without degrading its color and flavor. The extracted juice can be used as a beverage, a beverage flavor concentrate, or flavoring for jelly, yogurt, cream cheese and fancy desserts. Previously it has been necessary to use artificial cherry flavors for such products, because the heating or cooking badly degraded known natural cherry flavors.

From the foregoing it can be seen that the present method does not require large or complex processing equipment or techniques, yet it produces for the first time high quality flavoring from a natural product which has previously had little use as a flavoring. The flavoring so extracted has a flavor far superior to that of frozen, entirely thawed juice and a highly desirable blue-red color.

Having described the invention, what is claimed is:

1. A method of extracting cherry flavoring from cherries comprising, pressing cherries to produce juice, freezing said juice at a temperature of about 0-10° F. to form a solid mass, supporting said mass spaced above a liquid collector with said mass being removed from contact with liquid in said liquid collector, exposing said mass to ambient temperatures in the range of 32°-36° F., thereby causing a portion of the mass to liquify while another portion remains solid, and separating the liquid portion so formed as it thaws by promptly draining it into said collector and away from contact with said mass, until up to about 55-60% of the initial weight of said mass has been liquified and separated, said liquid portion comprising a cherry flavoring having a strong cherry flavor, sweet taste, and a deep blue-red color.

2. The method of claim 1 wherein said solid mass is exposed to temperatures in the range of about 32°-34° F.

3. The method of claim 1 further wherein a first portion of said solid mass is liquified by exposing said mass to temperatures below 32° F. before said exposing to temperatures in said 32-36° F. range, said first portion being drained into said collector and included with the portion liquified by said exposing to temperatures in the 32°-36° F. range.

4. The method of claim 1 wherein no more than approximately the first 55% of the initial weight of said solid mass to liquify is collected, and the remainder is discarded.

5. The method of claim 1 wherein the liquified portion is removed from contact with the remaining solid mass by draining it away as it liquifies.

6. The method of claim 1 wherein said freezing is carried out at a temperature in the range of about 0°-10° F.

7. The method of claim 1 wherein said cherries are sour cherries.

8. The method of claim 7 wherein said cherries are Montmorency cherries.

9. The method of claim 1 wherein said cherries are frozen for storage, then thawed before said pressing.

10. The method of claim 9 wherein said cherries are frozen without the addition of sugar.

11. The method of claim 9 wherein said cherries are chilled before they are frozen.

12. The method of claim 9 wherein said cherries are pitted before they are frozen for storage.

13. The method of claim 1 wherein said pressing is carried out without added heat.

14. The method of claim 1 wherein said thawing is carried out in an ordinary atmosphere.

15. The method of claim 1 including the further step of freezing said flavoring to preserve it thereafter.

16. The method of claim 1 including the further step of pasteurizing said flavoring to preserve it, at a temperature of about 180°-185° F.

17. The method of claim 1 including the further step of concentrating said flavoring by heating it at a temperature no higher than 212° F.

18. The method of claim 17 wherein said heating is carried out in a container over boiling water and without direct contact with the source of said heating.

19. The method of claim 1 wherein said solid mass has a minimum dimension greater than about 1".

20. The method of claim 1 wherein the liquified portion is drained from said solid mass without flowing over another such solid mass.

21. The method of claim 1 wherein several such solid masses are simultaneously exposed to ambient temperatures in the 32°-36° F. range while spaced apart from one another so that liquid from one such mass does not flow over another such mass.

22. The method of claim 1 wherein said solid mass is inverted, during said draining, from the position in which it was frozen.

23. The product of the method of claim 1.

* * * * *